(12) United States Patent
Larsson et al.

(10) Patent No.: US 6,452,987 B1
(45) Date of Patent: Sep. 17, 2002

(54) FAST START-UP IN DISCRETE MULTI-TONE (DMT) BASED COMMUNICATIONS SYSTEM

(75) Inventors: Patrik Larsson, Matawan; Jean-Jacques Werner, Holmdel; Jian Yang, Marlboro, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/199,775

(22) Filed: Nov. 25, 1998

(51) Int. Cl.$^7$ ................................................ H04L 27/08
(52) U.S. Cl. ........................................ 375/345; 375/229
(58) Field of Search ................................... 375/233, 231, 375/226; 370/503

(56) References Cited

U.S. PATENT DOCUMENTS

| | | | |
|---|---|---|---|
| 5,809,074 A | | 11/1996 | Werner et al. ............... 375/233 |
| 5,793,807 A | * | 8/1998 | Werner et al. ............... 375/233 |
| 6,137,809 A | * | 10/2000 | Martinez et al. ............ 370/503 |
| 6,219,378 B1 | * | 4/2001 | Wu .............................. 375/231 |
| 6,272,108 B1 | * | 8/2001 | Chapman ..................... 370/226 |
| 6,307,889 B1 | * | 10/2001 | Chun ........................... 375/260 |

OTHER PUBLICATIONS

G. A. Dumont et al., "The Multimodulus Blind Equalization Algorithm", (*IEEE, Proc. Thirteenth Int'l. Conference on Digital Signal Processing*, Santorini, Greece, 1997) pp. 127–130.

U.S. patent application Ser. No. 09/109,364, entitled "Blind Start–Up Of A Dual Mode CAP–QAM Receiver", filed Jul. 2, 1998.

\* cited by examiner

*Primary Examiner*—Stephen Chin
*Assistant Examiner*—Kevin Kim

(57) ABSTRACT

In an Asymmetric Digital Subscriber Loop (ADSL) Discrete Multi-Tone (DMT) system, a DMT receiver uses, during start-up, an automatic gain control (AGC) element and a rotator element in place of a one-tap complex finite impulse response (FIR) filter.

63 Claims, 12 Drawing Sheets

US 6,452,987 B1

FAST START-UP IN DISCRETE MULTI-TONE (DMT) BASED COMMUNICATIONS SYSTEM

FIELD OF THE INVENTION

This invention relates generally to communications and, more particularly, to high-speed data communications systems.

BACKGROUND OF THE INVENTION

Plain Old Telephone Service (POTS) is typically deployed to individual subscribers over a twisted pair of wires. Today, in addition to voice services, more and more subscribers want high-speed data access to, e.g., the Internet, over this twisted pair. A technology that increases the transmission capacity over a twisted pair is Asymmetric Digital Subscriber Line (ADSL), which provides transmission capabilities of millions of bits per second (Mbps), One standard for ADSL transmission is ANSI T1.413 (e.g., see "Standards Project for Interfaces Relating to Carrier to Custom Connection of Asymmetrical Digital Subscriber Line (ADSL) Equipment", *T1E1 Specification*, 1997). This standard specifies the use of Discrete Multi-Tone (DMT) modulation. DMT modulation is a form of orthogonal frequency division multiplexing (OFDM) and utilizes multiple carriers (also sometimes referred to as subcarriers, channels, or bins; hereafter the term bin is used) for conveying information. In DMT modulation, the allocated frequency range is divided into K bins, K>1, each bin separated by approximately 4 kHz. In such an approach, a DMT-based ADSL system transmits what is referred to as "multi-tone symbols" or "DMT symbols."

In discrete multitone (DMT) receivers, a frequency domain equalizer (FEQ) is used to converge the symbol constellation for each bin. The FEQ is normally a one-tap complex finite impulse response (FIR) filter adapted by a Least Mean-Square (LMS) based algorithm (e.g., see, Chow, J. K., Tu, J. C. and Cioffi, J. M., "A Discrete Multitone Transceiver System for HDSL Applications," *IEEE J. on Selected Areas in Commun.*, vol. 9, no. Aug., 6, 1991; and Lee, I. Chow J. S. and Cioffi, J. M., "Performance Evaluation of a Fast Computation Algorithm for the DMT in High-Speed Subscriber Line," *IEEE J on Selected Area in Commun.* vol. 13, no. 9, 1995). Unfortunately, the convergence rate is slow (e.g., on the order of 20 secs.) if the FEQ is updated by the LMS algorithm or most other standard equalization algorithms. This slow convergence is a result of the dependency of convergence rate on received signal power. For example, for an 8 kft (kilo-feet) loop, received signals (bins) at high frequencies have about 45 dB more power attenuation than the received bins at low frequencies—resulting in different convergence rates for different parts of the received DMT signal.

SUMMARY OF THE INVENTION

We have realized a method and apparatus that improves convergence speed and enhances tracking capability in a DMT receiver. In particular, and in accordance with the principles of the invention, a DMT receiver uses an automatic gain control (AGC) element and a rotator element for use in equalizing the received DMT signal in each bin. As a result, the dependency of convergence rate on input power is reduced.

In an embodiment of the invention, during start-up a DMT receiver uses an automatic gain control (AGC) element and a rotator element in place of a one-tap complex finite impulse response (FIR) filter (as noted above updated using the LMS algorithm). This technique is applicable to receivers using non-blind equalization and blind equalization. In the latter case there is an additional benefit—it eliminates the need for a training sequence.

DETAILED DESCRIPTION

Figure 1:
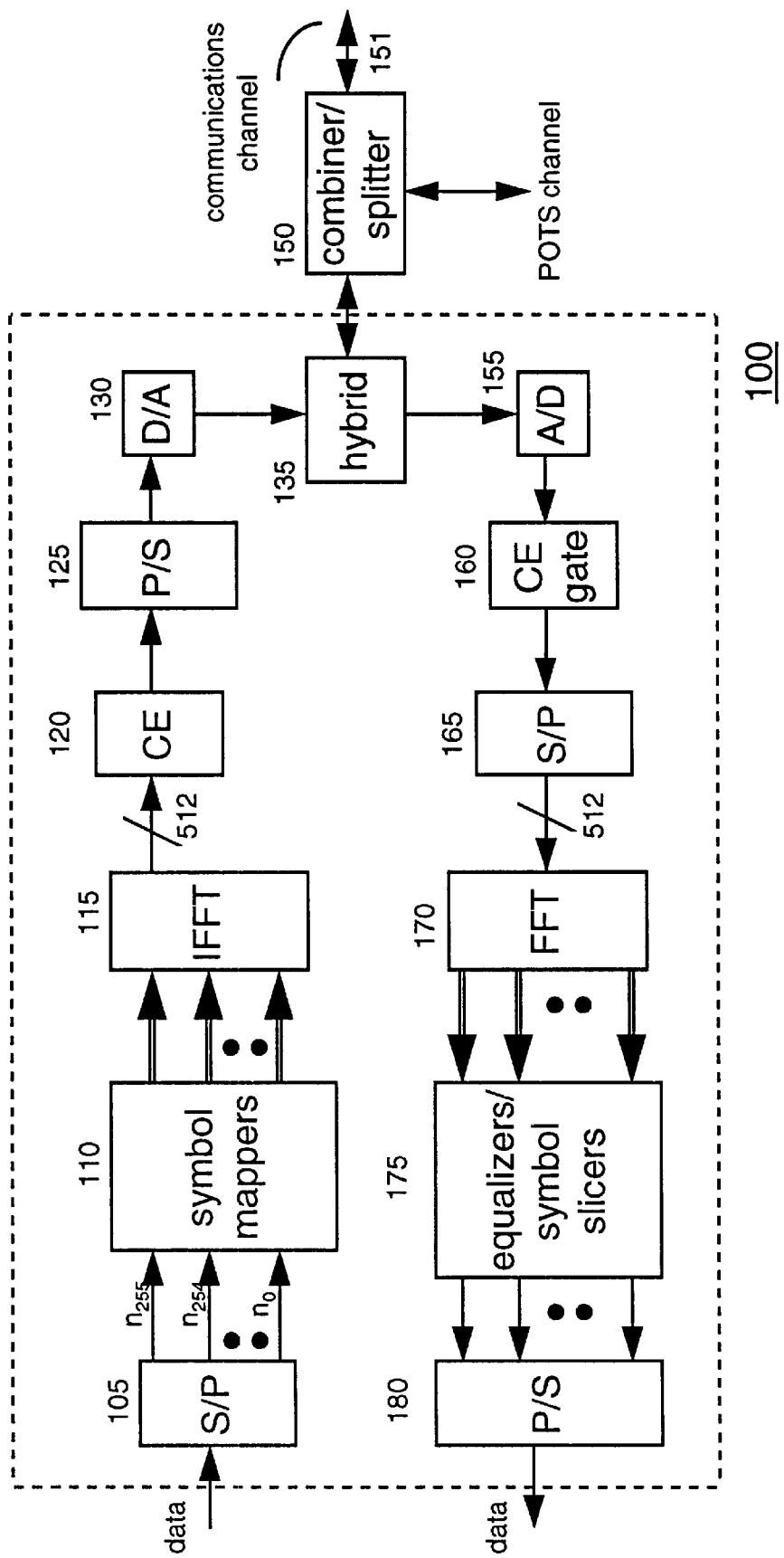
FIG. 1 illustrates prior art ADSL communications equipment.
Figure 2:
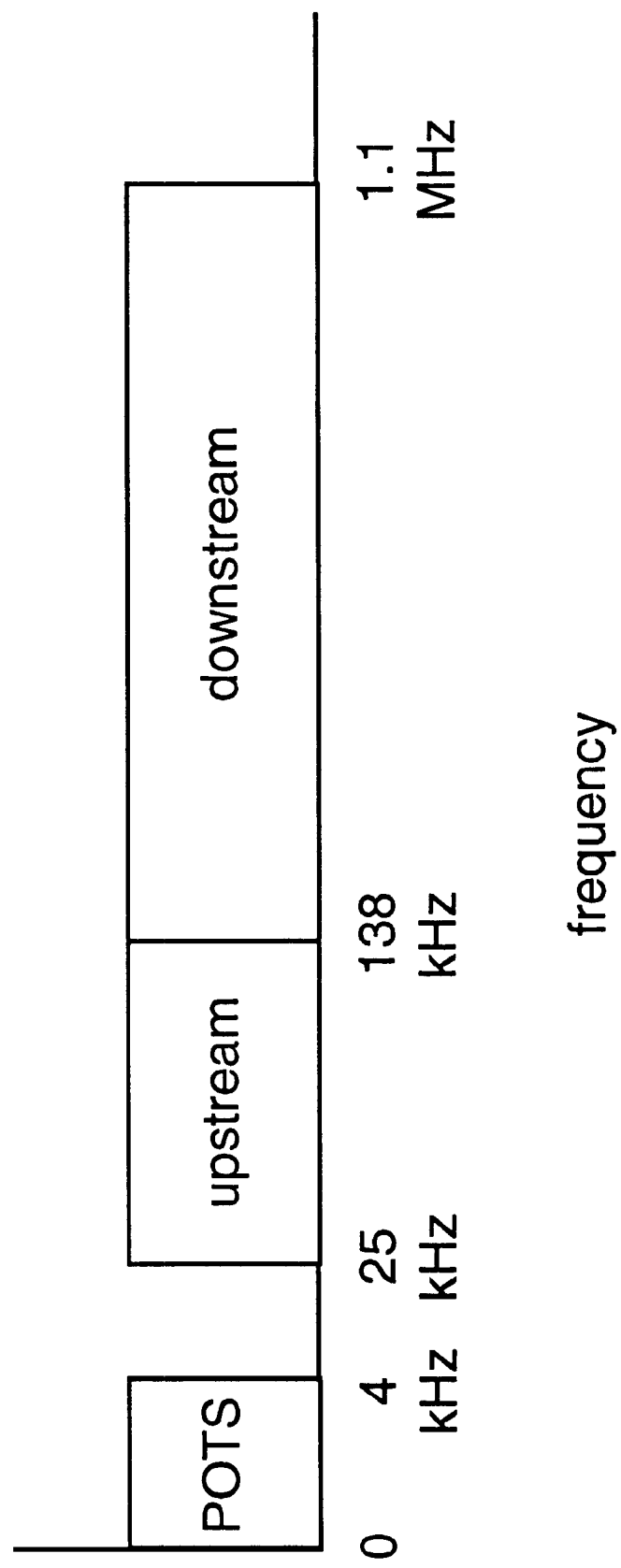
FIG. 2 shows an illustrative ADSL bandwidth allocation.

Before describing the inventive concept, prior art ADSL communications is described in order to provide some background information. ADSL allocates different amounts of bandwidth between upstream communications and downstream communications (hence the term "asymmetric"), with upstream communications having less bandwidth than downstream communications. In this context, there are different strategies for specific bandwidth allocation and different modulation methods available. For example, in the upstream direction, i.e., from a subscriber's consumer premises equipment (CPE) to a central office (CO) (or local exchange carrier (LEC)) the upstream channel may have an allocated bandwidth from 25 kHz (kilohertz) to 138 kHz; while in the downstream direction, i.e., from the CO to the CPE, the downstream channel may have an allocated bandwidth from 138 kHz to 1.1 MHz. (The POTS voice channel (0 to 4 kHz) is unaffected by ADSL.). In this example, the upstream channel and downstream channel are disjoint and also adjacent. However, ADSL systems can be constructed where the upstream channel partially overlaps with the downstream channel. While this provides more bandwidth for the downstream signal, this also requires the use of echo cancellation techniques. Turning now to FIG. 1, it is assumed that ADSL equipment 100 is located at the CPE end. The elements shown in FIG. 1 are well-known and will not be described in detail. The corresponding ADSL equipment located at the central office, i.e., the far-end ADSL equipment, is similar and will not be described herein. It is assumed that ADSL equipment 100 conforms to ANSI T1.413. Also, it is assumed the ADSL system represented by FIG. 1 allocates bandwidth as shown in FIG. 2. The POTS channel is in the 0 to 4 kHz range, the upstream channel, i.e., from the CPE to the CO, is in the 25 kHz to 138 kHz; while the downstream channel, from the CO to the CPE, is in the 138 kHz to 1.1 MHz range. As such, the upstream channel and downstream channel are disjoint and also adjacent.

Returning to FIG. 1, the transmitter portion of ADSL equipment 100 comprises serial-to-parallel converter (S/P) 105, symbol mappers 110, inverse fast Fourier transform element (IFFT) 115, cyclic extender (CE) 120, parallel-to-serial converter (P/S) 125, digital-to-analog converter (D/A) 130, and hybrid 135. A data signal is applied to S/P 105, which converts the data signal from serial to parallel form and provides 256 signals $n_0$ through $n_{255}$. Signals $n_0$ through $n_{255}$ are applied to symbol mappers 110. The latter comprises 256 symbol mappers, one for each of the parallel output signals of S/P 105. (As described further below, the number of bits encoded by each symbol mapper, and hence the number of bits S/P 125 provides in each ni is determined as a result of a spectral response determined during a training phase.) The resulting 256 output symbol streams from symbol mappers 110 are complex valued and are applied to IFFT 115, which provides 512 output samples. (IFFT 115 takes the complex conjugate (not shown) of the 256 output symbol streams to provide 512 real signals.) The 512 output signals from IFFT 115 are applied to CE 120, which performs cyclic extension (e.g., see ANSI T1.413) and provides extended DMT frames in parallel form. (Cyclic extension is one form of reducing intersymbol interference (ISI), i.e., adjacent DMT frames interfering with each other. In cyclic extension, a DMT frame is partially, and cyclically, extended in both directions.) The extended DMT frames are then applied to P/S 125 to provide a serial output signal that is converted from digital to analog by D/A 130. The latter provides a upstream ADSL signal representing a sequence of extended DMT frames, to hybrid 135, which couples this upstream ADSL signal to combiner/splitter 150, which adds in the POTS channel. The output signal from combiner/splitter 150 comprises the POTS channel in the 0 to 4 kHz range and the upstream signal in the 25 kHz to 138 kHz range and is applied to the communications channel, represented by twisted pair 151. (It should be noted that for the purposes of this description the terms extended DMT frames and DMT frames are interchangeable.)

The receiver portion of ADSL equipment 100 comprises hybrid 135, analog-to-digital converter (A/D) 155, CE gate 160, S/P 165, fast Fourier transform element 170, equalizer/symbol slicer 175, and P/S 180. Combiner/splitter 150 splits out the POTS channel from the signal present on twisted pair 151 and provides the remaining downstream ADSL signal (in the 138 kHz to 1.1 MHz range) to hybrid 135. The latter couples the downstream ADSL signal to A/D 155, which converts the signal from analog to digital for application to CE gate 160. CE gate 160 extracts DMT frames from each received extended DMT frame, as known in the art. (It should be noted that the function of CE gate 160 could alternatively be performed after S/P 165.) The output signal from CE gate 160 is applied to S/P 165, which provides 512 output signals to FFT 170 which recovers the symbols from each of the carriers. (It should be noted that a time domain equalizer can also be used to process the received signal before operation by S/P 165.) Equalizers/symbol slicers 175 represents a plurality of equalizer and symbol slicer structures, one for each carrier for recovering the data signal in parallel form (described further below). The output signals of equalizers/symbol slicers 175 are applied to P/S 180 for converting the data signal back into serial form. (It should be noted that P/S 180 includes other elements, such as, e.g., a Viterbi decoder (not shown), etc., for use in recovering the data signal.)

Figure 3:
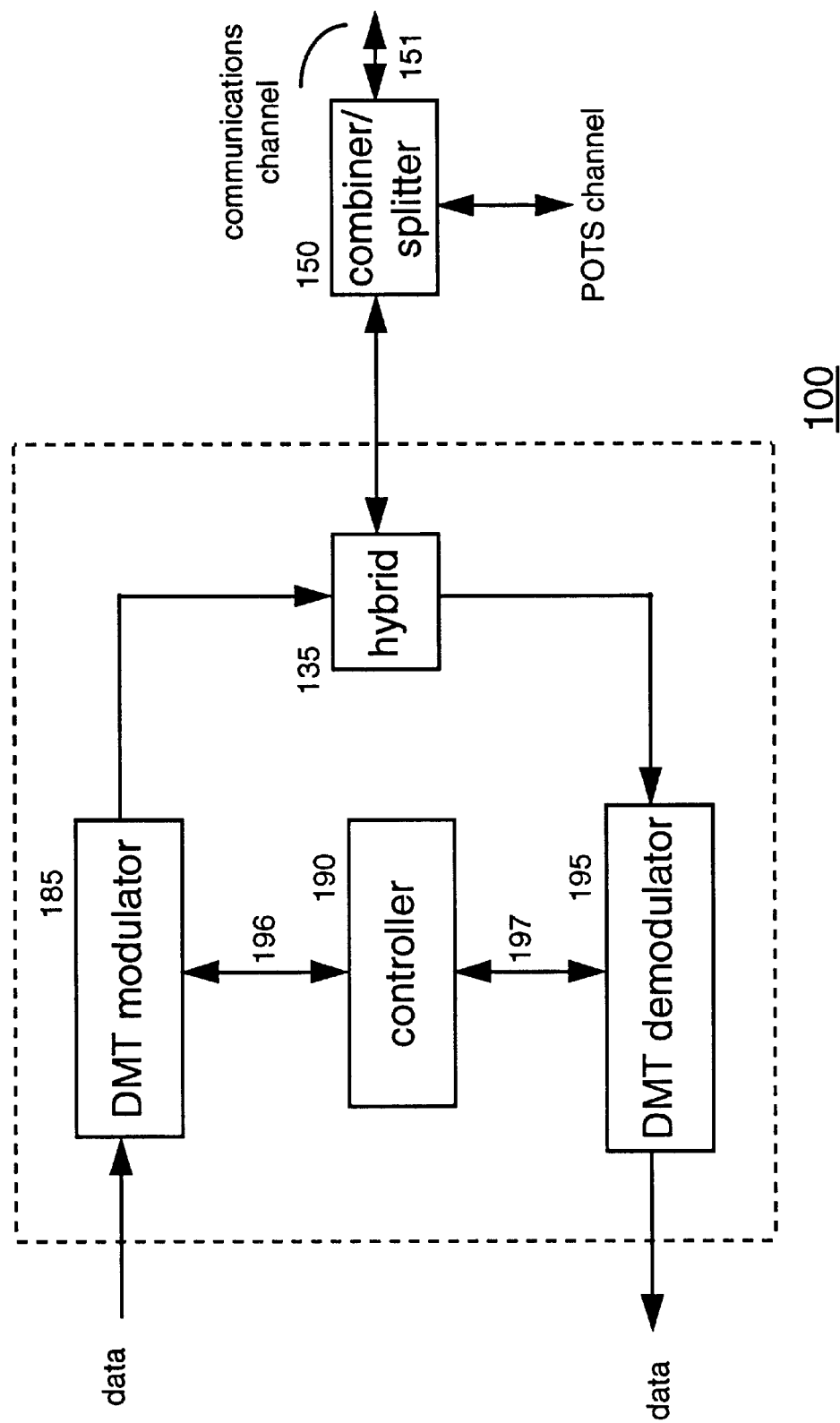
FIG. 3 illustrates another representation of prior art ADSL communications equipment.

An alternative representation of prior art ADSL equipment is shown in FIG. 3. It should be noted that like numbers in different figures are similar elements. ADSL equipment 100 is shown in FIG. 3 as comprising DMT modulator 185, DMT demodulator 195, hybrid 135, and controller 190. DMT modulator 185 operates as described above with respect to transmission of an ADSL signal and includes the above-mentioned components of FIG. 1 such as S/P 105, etc. Similarly, DMT demodulator 195 operates as described above with respect to reception of an ADSL signal and includes the above-mentioned components of FIG. 1 such as A/D 155, etc.

Also shown in FIG. 3 is controller 190, which is illustratively a stored-program controller and associated memory as known in the art. Controller 190 controls and receives information from DMT modulator 185 and DMT demodulator 195, via signaling 196 and 197, respectively. Generally speaking, an ADSL communications session comprises a training phase (which is a part of a start-up phase) and a communications phase (which is also referred to herein as a steady-state phase). During training, ADSL equipment 100 exchanges signaling with the far-end ADSL equipment (not shown). Controller 190 uses this signaling to establish the above-mentioned spectral response of communications channel 151 (as does a similar controller in the far-end ADSL equipment). The spectral response is affected by such items as cross-talk, physical loop length of the twisted pair of communications channel 151, etc. To determine the spectral response of the twisted pair, controller 190 generally performs the following steps. First, DMT modulator 185 transmits a wide band test signal to the far-end ADSL equipment. Upon receipt, the far-end ADSL equipment evaluates the received signal to determine the signal-to-noise ratio (SNR) in each bin. Once the spectral response is determined, the far-end ADSL equipment generates a bit loading table and sends the bit loading table to ADSL equipment 100. The bit loading table includes, for each carrier, a number of bits that each carrier can support. The bit loading table is used by controller 190 to select various operating parameters such as symbol mappings at each carrier. (Although each carrier can support up to M bits of information, the actual amount of bits a carrier supports varies due to the spectral response of the twisted pair at the different carrier frequencies. For example, one carrier may be able to accommodate 12 bits while another may be only able to accommodate 2 bits.) Once the training phase is complete, transmission can begin, i.e., the ADSL communications session enters the communications phase.

Figure 4:
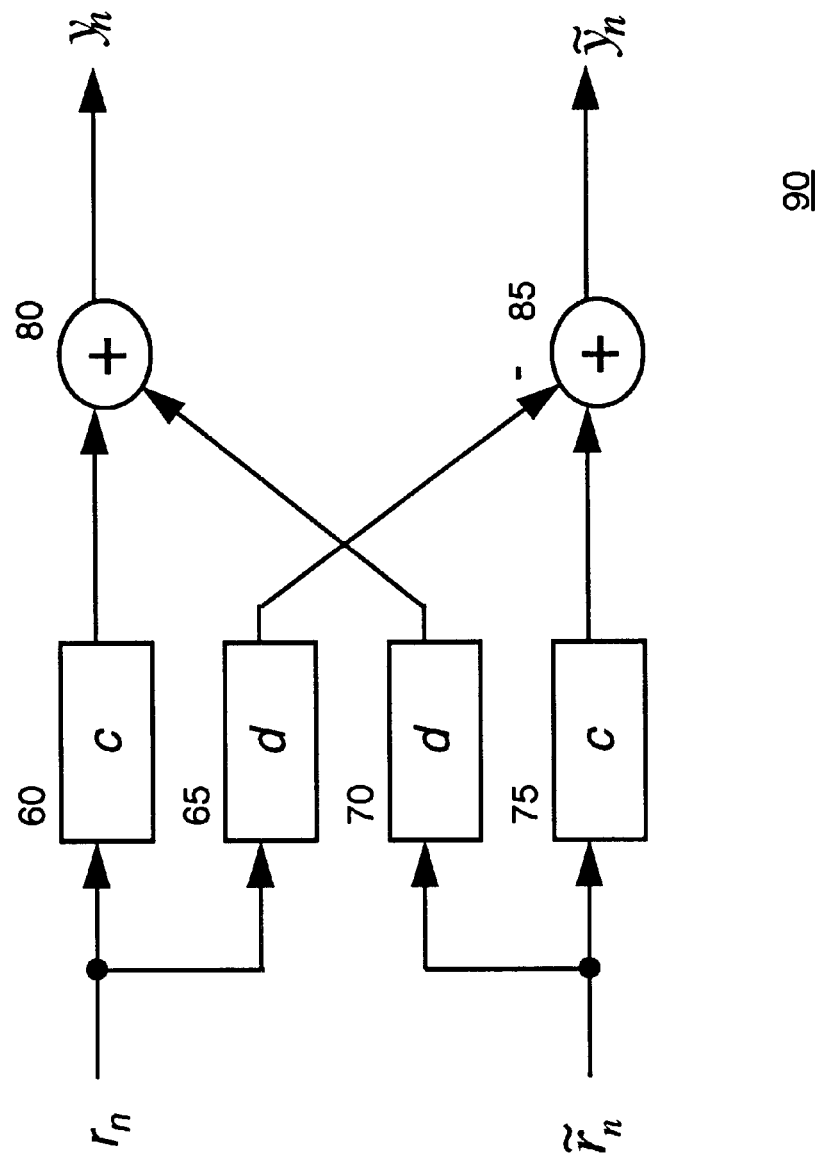
FIG. 4 illustrates a one-tap complex filter.

As noted above, in a DMT receiver, equalizers/symbol slicers 175 (FIG. 1) is used to recover the data signal. In particular, equalizers/symbol slicers 175 is a plurality of frequency domain equalizers (FEQ), each of which are used to converge the constellation for each bin. As noted earlier, the FEQ is normally a one-tap complex FIR filter adapted by the LMS algorithm. The one-tap complex equalizer for each bin performs two functions: (1) to compensate for channel gain loss and (2) to correct for channel phase offset. An illustrative one-tap complex FIR filter, 90, is shown in FIG. 4 comprising filters 60 and 75 (each comprising a single in-phase tap coefficient, c), filters 65 and 70 (each comprising a single quadrature-phase tap coefficient, d), and elements 80 and 85. This one-tap complex filter is updated by the LMS algorithm. For the LMS algorithm, the cost function that is usually used is the mean-squared error (MSE) defined as:

$$CF = [|\hat{E}_n|^2] = [|Y_n - A_n|^2]. \tag{1}$$

The complex components in (1) are defined as $$Y_n = y_n + j\tilde{y}_n, A_n = a_n + jb_n, E_n = e_n + j\tilde{e}_n. \quad (2)$$

During the training period, a sequence of symbols $A_n$ is sent by the transmitter and is known to the receiver. The latter then adapts the equalizer with a so called ideal reference. The symbols $A_n$ become sliced symbols $\hat{A}_n$ in steady-state operation. The tap updating for the LMS algorithm is normally done by a steepest-descent gradient method (e.g., see Widrow, S. "Adaptive Signal Processing", Prentice-Hall, 1985). The adaptation algorithm of the filter taps for the cost function given in (1) is then derived as $$C_{n+1} = C_n - \alpha \hat{E}_n R_n, \quad (3)$$

where the complex tap is $C_n = c_n + jd_n$, $\hat{E}_n = \hat{e}_n + j\hat{\tilde{e}}_n$, and $R_n = r_n + j\tilde{r}_n$. A blind equalization algorithm can also be used to start the equalizer. The updating equations for the commonly used blind algorithms RCA ("reduced constellation algorithm," e.g., see Y. Sato, "A Method of Self-Recovering Equalization for Multilevel Amplitude-Modulation Systems," *IEEE Trans. Commun.*, pp. 679–682, June 1975; and U.S. Pat. No. 4,227,152, issued Oct. 7, 1980 to Godard), MMA ("multimodulus algorithm," e.g., see Yang, J. and Werner, J. J. and Dumont, G. D., "The Multimodulus Blind Equalization Algorithm", *Proc. Thirteenth Int' Conf. On Digital Signal Processing, Santorini, Greece*, 1997), and CMA ("constant modulus algorithm," e.g., see D. N. Godard, "Self-Recovering Equalization and Carrier Tracking in Two-Dimensional Data Communications Systems," *IEEE Trans. Commun.*, vol. 28, no. 11, pp. 1867-1875, November 1980; and N. K. Jablon, "Joint Blind Equalization, Carrier Recovery, and Timing Recovery for High-Order QAM Signal Constellations", *IEEE Trans. Signal Processing*, vol. 40, no. 6, pp. 1383–1398, 1992.) for single carrier, two filter, systems are given by:

$$RCA: c_{n+1} = c_n - \alpha(y_n - R\,\text{sgn}(y_n))r_n, \quad (4)$$

$$MMA: c_{n+1} = c_n - \alpha(y_n^2 - R^2)y_n r_n, \quad (5)$$

and $$CMA: c_{n+1} = c_n - \alpha((y_n^2 + \tilde{y}_n^2) - R^2)y_n r_n, \quad (6)$$

where the computation of the constant R can be found in the above-mentioned article on "The Multimodulus Blind Equalization Algorithm," by Yang, J. and Werner, J. J. and Dumont, G. D. It should be noted that only the updating algorithms for the in-phase dimension are shown above.

Figure 5:
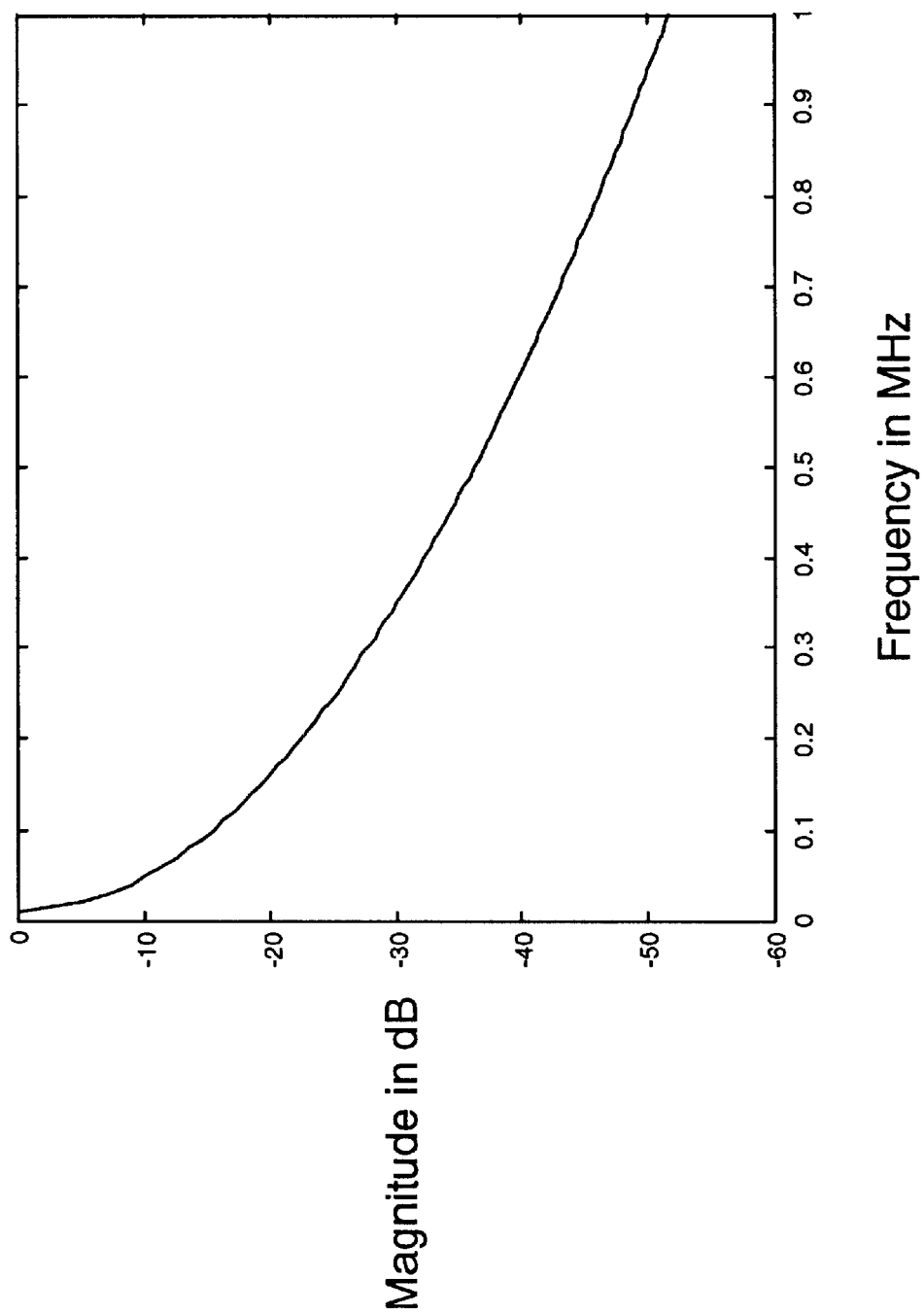
FIG. 5 shows an illustrative graph of channel attenuation for an 8,000 foot UTP cable.

Normally, DMT communications systems use several thousand feet of UTP (unshielded twisted pair) cable. FIG. 5 shows that about 52 dB of channel attenuation occurs for a 8,000 foot cable up to 1 MHz. From equation (3) it can be observed that the input signal level $r_n$ directly affects the tap adaptation for the LMS algorithm. Consequently, the MSE converges faster with higher power input signals for lower bins than lower power input signals for higher bins. Similar to the LMS algorithms, the updating algorithms for RCA and MMA given in equations (4), (5) and (6) also involve the input signal $r_n$. Consequently, for any equalizer using standard updating there is poor adaptation tracking for high frequency bins by using stochastic gradient algorithms.

Therefore, we have realized a method and apparatus that improves convergence speed and enhances tracking capability in a DMT receiver. In particular, and in accordance with the principles of the invention, a DMT receiver, during start-up, uses an automatic gain control (AGC) element and a rotator element for use in equalizing the received DMT signal in each bin. As a result, the dependency of convergence rate on input power is reduced. Additionally, this approach does not require the use of a training signal.

Figure 6:
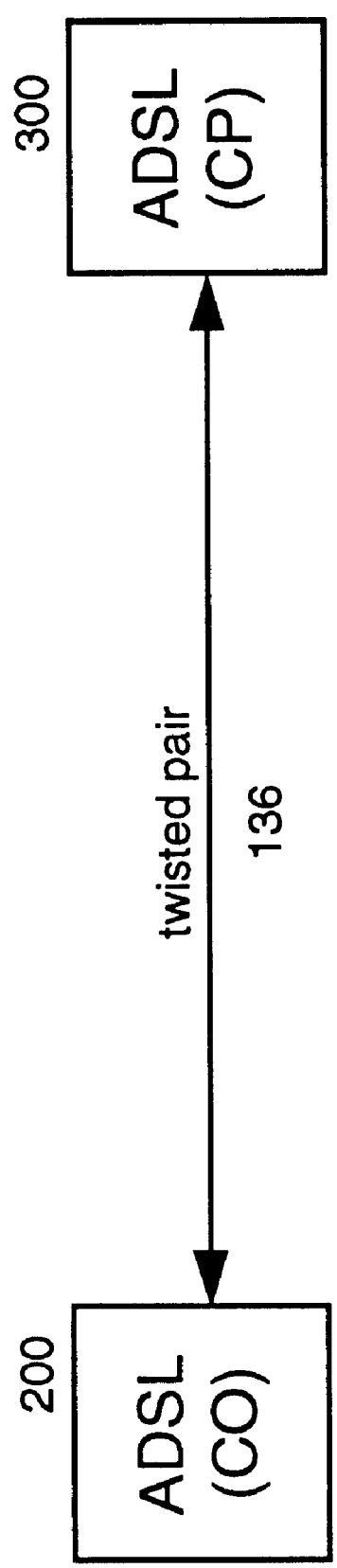
FIG. 6 shows an ADSL communications system in accordance with the principles of the invention.

An illustrative ADSL system embodying the principles of the invention is shown in FIG. 6. As described further below, this ADSL system performs fast start-up. The ADSL system comprises ADSL CO equipment 200 coupled to ADSL consumer premise (CP) equipment 300 via twisted pair 136. Each of these is also referred to herein as a multi-carrier endpoint. (The splitter/combiner for the POTS channel has been left out for simplicity.) It is assumed that the ADSL DMT system has disjoint and adjacent upstream and downstream channels (although this is not necessary to the inventive concept). For simplicity, only downstream transmission is described. Upstream transmission is similar and will not be described herein. It should be noted that, other than the inventive concept, the elements shown in FIGS. 6–12 are well-known and will not be described in detail.

Figure 7:
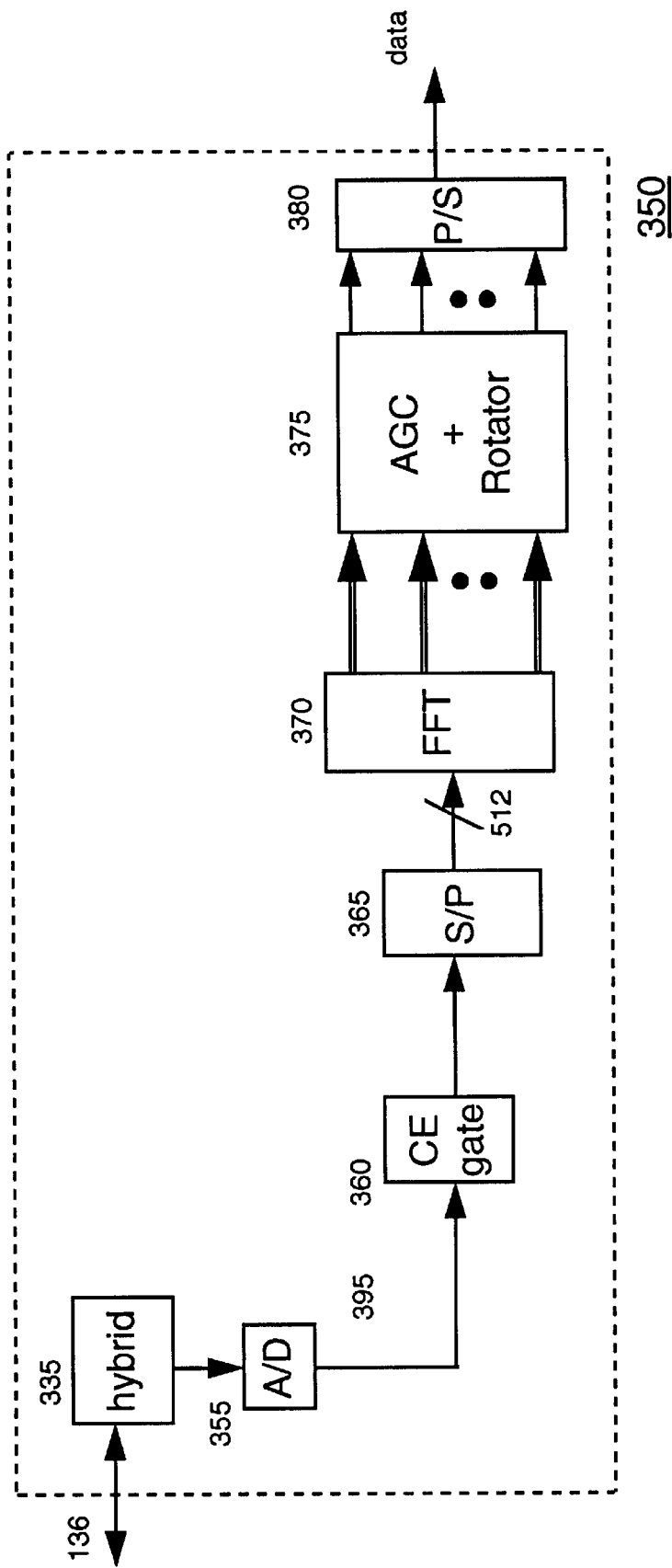
FIG. 7 shows a portion of a receiver in accordance with the principles of the invention.

The receiver portion of corresponding multi-carrier equipment embodying the principles of the invention is shown in FIG. 7. Receiver portion 350 of ADSL CP equipment 300 comprises hybrid 335, analog-to-digital converter (A/D) 355, CE gate 360, S/P 365, fast Fourier transform element 370, AGC+Rotator 375, and P/S 380. (It should be noted P/S 380 includes other elements, such as, e.g., a Viterbi decoder (not shown), etc., for use in recovering the data signal. Also, as noted above, a time domain equalizer can also be used to process the received signal before operation by S/P 365.) Hybrid 335 couples the received downstream ADSL signal from twisted pair 136 to AID 355, which converts the signal from analog to digital and provides a digital form of a received multi-carrier signal representing a sequence of received extended DMT frames. CE gate 360 extracts a DMT frame from each received extended DMT frame, as known in the art. (It should be noted that the function of CE gate 360 could alternatively be performed after S/P 365.) The output signal from CE gate 360 is applied to S/P 365, which provides 512 output signals to FFT 370 which recovers the symbols from each of the carriers. In accordance with the invention, in place of a one-tap complex finite impulse response (FIR) filter an AGC+Rotator 375 is used. AGC+Rotator 375 represents a plurality of such AGC+Rotator structures, one for each bin, for recovering the data signal in parallel form. The output signals of AGC+Rotator 375 are applied to P/S 380 for converting the data signal back into serial form.

Figure 8:
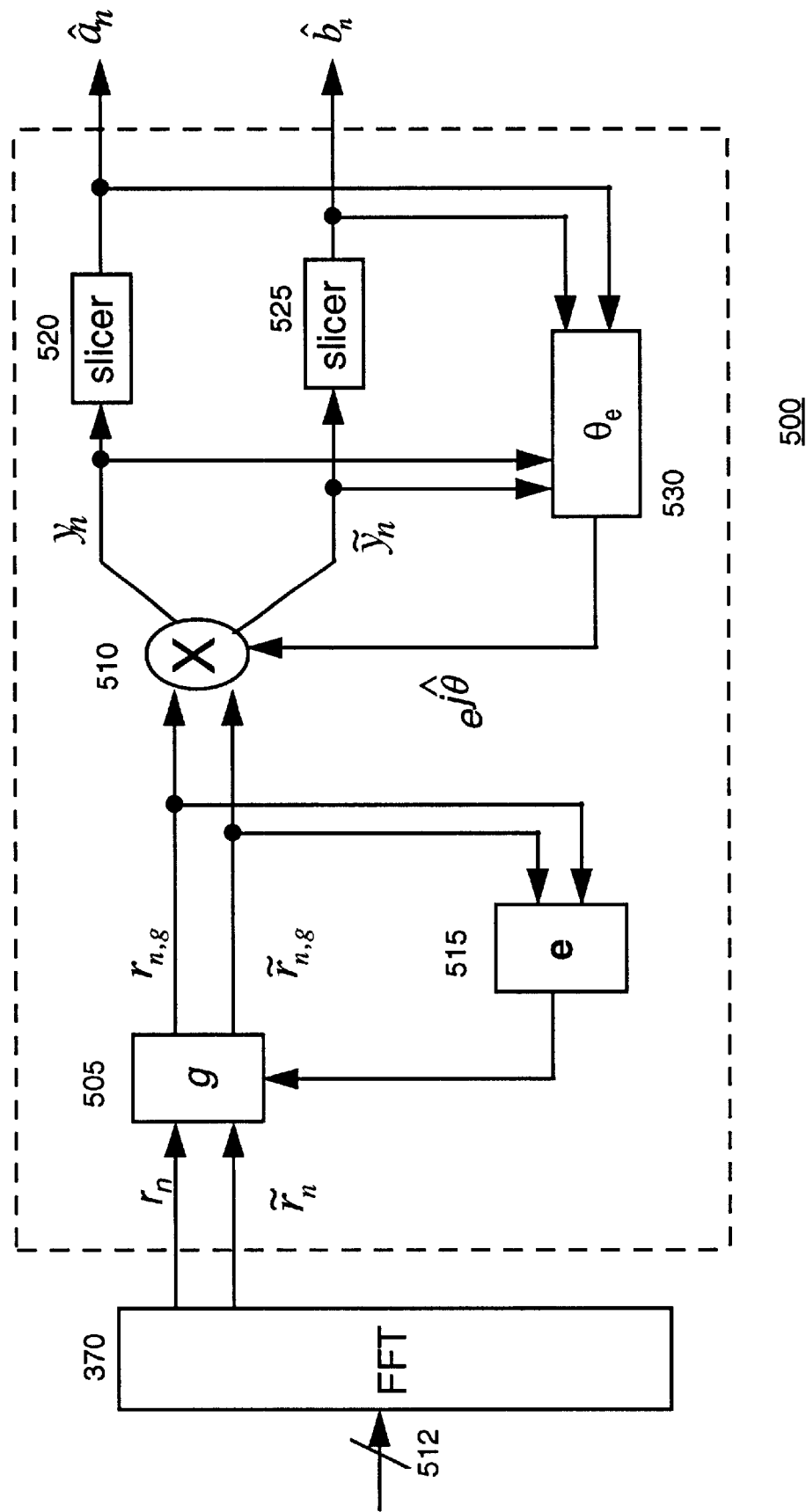
FIG. 8 shows a block diagram of an illustrative AGC+ rotator structure in accordance with the invention.

Turning now to FIG. 8, an illustrative block diagram of an AGC+rotator structure 500 is shown for a single bin signal. The AGC portion is represented by element 505, hereafter referred to as AGC 505. Other than the inventive concept, AGC 505 functions as in the prior art (e.g., see Bingham, J. A. C., "The Theory and Practice of Modem Design", *Wiley Interscience*, 1988). AGC 505 is a one real-tap filter comprising tap coefficient vector g. The output signal $R_n$ of FFT 370 represents a sequence of received symbols (for a bin) and is applied to AGC 505. (It should be noted that each bin of a DMT signal is indexed from 0 to 511. For simplicity, the index i is skipped in the following discussion.) The output signal $R_{n,g}$ of AGC 505 is computed as:

$$R_{n,g} = g^* R_n, \quad (7)$$

where g is a one real-tap filter and $R_{n,g} = r_{n,g} + j\tilde{r}_{n,g}$. One example of an AGC algorithm is to define the error of the AGC as:

$$e_n = (|R_{n,g}|^2 - R_p^2).\text{tm (8)}$$

Here $R_p^2$ is the expected power of the received symbols $R_n$. Assuming a 16-point square constellation, $R_p^2$ is calculated by:

$$R_p^2 = \tfrac{1}{2}(1^2 + 3^2) = 5. \tag{9}$$

AGC 505 is then updated as $$g_{n+1} = g_n - \alpha e_n. \tag{10}$$

There are other ways to compute the error of the AGC such as to use the peak-to-average power, or the absolute value, etc. Due to the consideration of the tremendous channel attenuation in DMT applications, the square root of the averaged power is used to adjust the gain loss. As such, equation (7) is replaced with the following:

$$e_n = (\sqrt{|R_{n,g}|^2} - R_p).\text{tm} \tag{11}$$

The use of equation (11) reduces the error differences among all bins, and it further leads to reduce the difference of convergence rate for all bins. It should be noted that instead of using one step size for all the bins, different step sizes can be used to improve the convergence rate. Another way to reduce the difference of the convergence rates is to initialize the AGC gains with the inverse of the channel. The implementation of doing this is to average the power of FFT for each channel, e.g., $$R_{ave}^2 = \frac{1}{N} \sum_{n=1}^{N} R_n^2. \tag{12}$$

Illustratively, N=5 and each channel is initialized with:

$$R_{n,int} = \frac{1}{\sqrt{R_{ave}^2}}. \tag{13}$$

The use of the square root of the average power in equation (13) further reduces the dependency of the convergence rate on input power.

As noted earlier, each one-tap complex equalizer used in the prior art DMT structure performs two functions: (1) to compensate for channel gain loss and (2) to correct for channel phase offset. As such, similar requirements must be performed by the AGC+rotator structure 500. As can be observed from above, AGC 505 is used to adjust for channel propagation loss. In addition, rotator 510 is used to correct for channel phase offset. Other than the inventive concept, rotator 510 functions as in the prior art (e.g., see Gitlin, R. D., Hayes, J. F. and Weinstein, S. B., "Data Communications Principle", *Plenum Press*, 1992).

The output signals of rotator 510 are computed as:

$$Y_n = R_{n,g} \times e^{j\theta_n}. \tag{14}$$

Rotator 510 is updated by:

$$\theta_{n+1} = \theta_n - \alpha \hat{\theta}_e. \tag{15}$$

The rotator correction term is estimated as:

$$\hat{\theta}_e = Im\{Y_n \times \hat{A}_n^*\} = \tilde{y}_n \hat{a}_n - y_n \hat{b}_n, \tag{16}$$

where * refers to the conjugate. The estimated symbols, $\hat{A}_n$, are the output signals of slicers 520 and 525, where:

$$Y_n \rightarrow \hat{A}_n. \tag{17}$$

For a blind start-up, four-point slicers are illustratively used to obtain the estimated symbols. From this, the rotator error is simplified as:

$$\hat{\theta}_e = \tilde{y}_n Rsgn(y_n) - y_n Rsgn(\tilde{y}_n) = R(\tilde{y}_n sgn(y_n) - y_n sgn(\tilde{y}_n)). \tag{18}$$

The calculation of the phase error $\theta_e$ is simply the product of a symbol for one-dimension multiplied by the sign of a symbol for another dimension.

Figure 9:
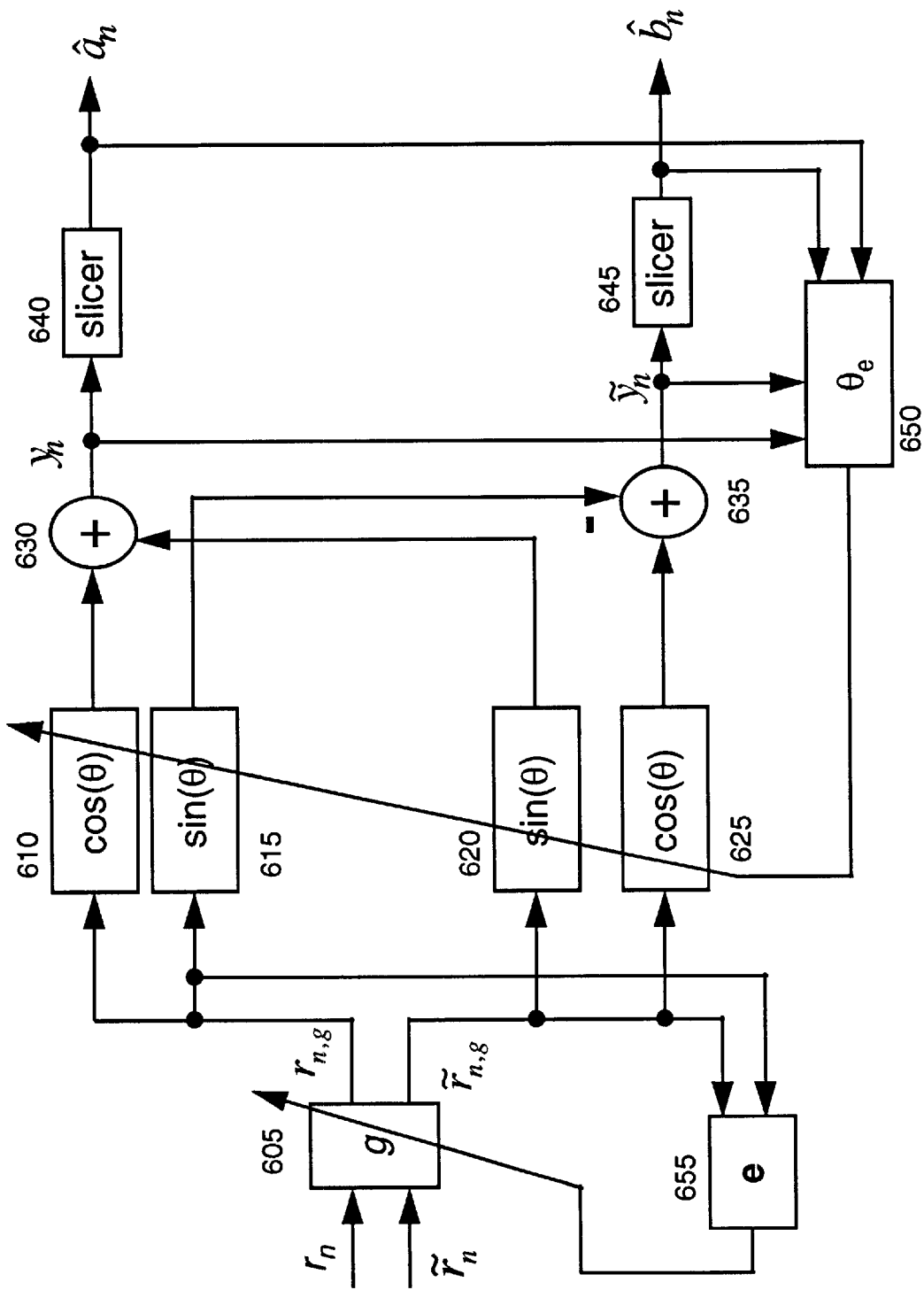
FIG. 9 shows an illustrative equivalent four filter structure for an AGC+Rotator.

It should be noted that both the AGC and rotator equations described above are error-driven algorithms and, as such, are not steepest-descent gradient algorithms. While the AGC and rotator can make the initial convergence faster, this type of approach does not give the optimal convergence performance during steady-state. Thus, the LMS algorithm should be used in steady-state to improve performance. Since, as noted earlier, the LMS algorithm is an input power dependent algorithm, an AGC is still needed in front of the equalizer to enhance the input power for the higher bins. In accordance with the principles of the invention, an illustrative equivalent four filter structure for such an AGC+Rotator is shown in FIG. 9 for use during initialization, or start-up. It can be shown that the structures of FIGS. 8 and 9 are equivalent. In start-up, the complex filter of FIG. 9 is updated by the method provided for the rotator in equation (15), above. In order to switch to using the LMS algorithm during steady-state, the complex filters from the rotator need to be converted:

$$c_n = \cos(\theta_n) \text{ and } d_n = \sin(\theta_n). \tag{19}$$

Figure 10:
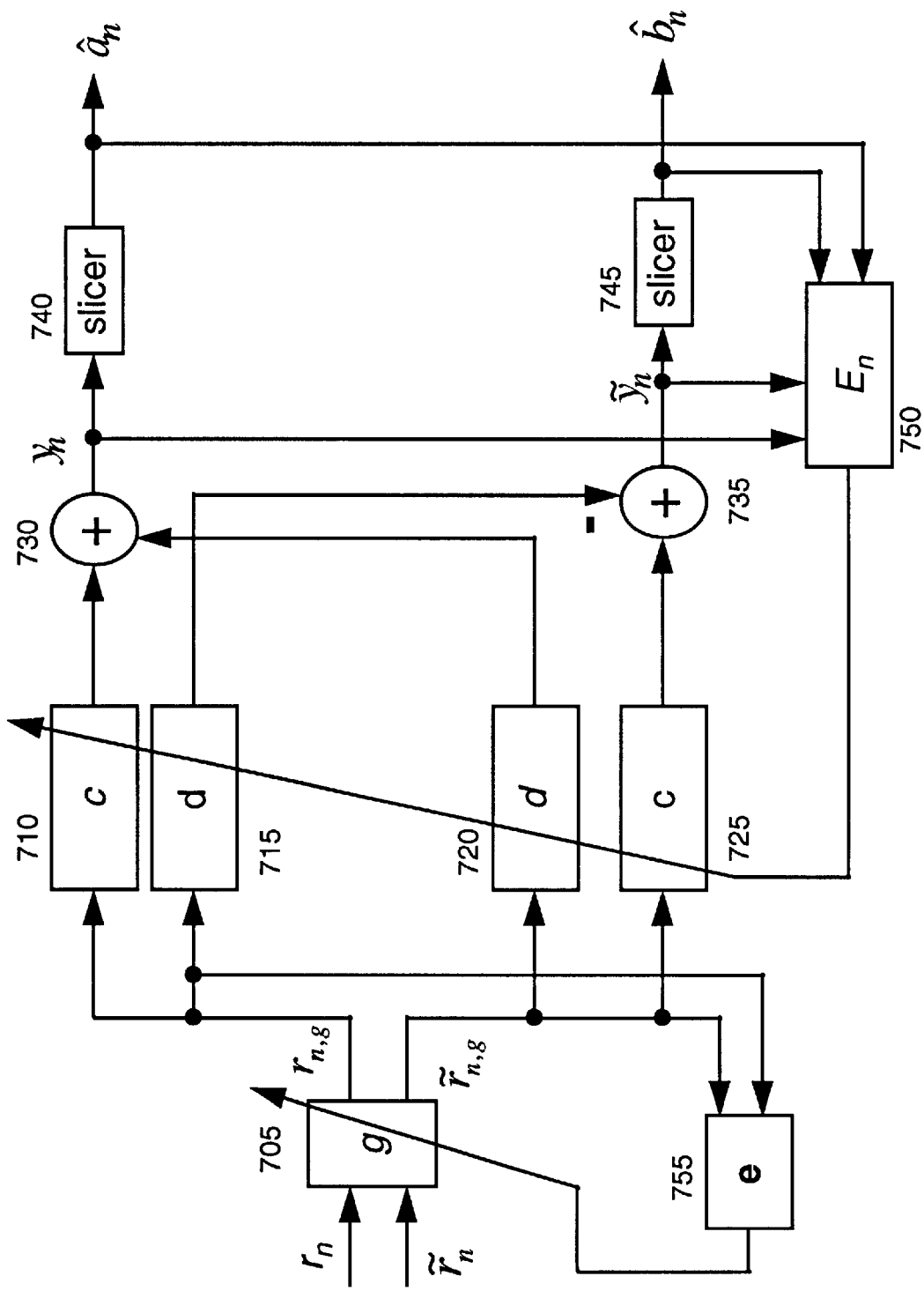
FIG. 10 shows an illustrative AGC+Equalizer utilizing the LMS algorithm during steady-state.

Once this is done, the LMS algorithm is illustratively implemented as shown in FIG. 10 for use during steady-state. In steady-state, the complex filter of FIG. 10 is updated by the algorithm provided in equation (3).

Figure 11:
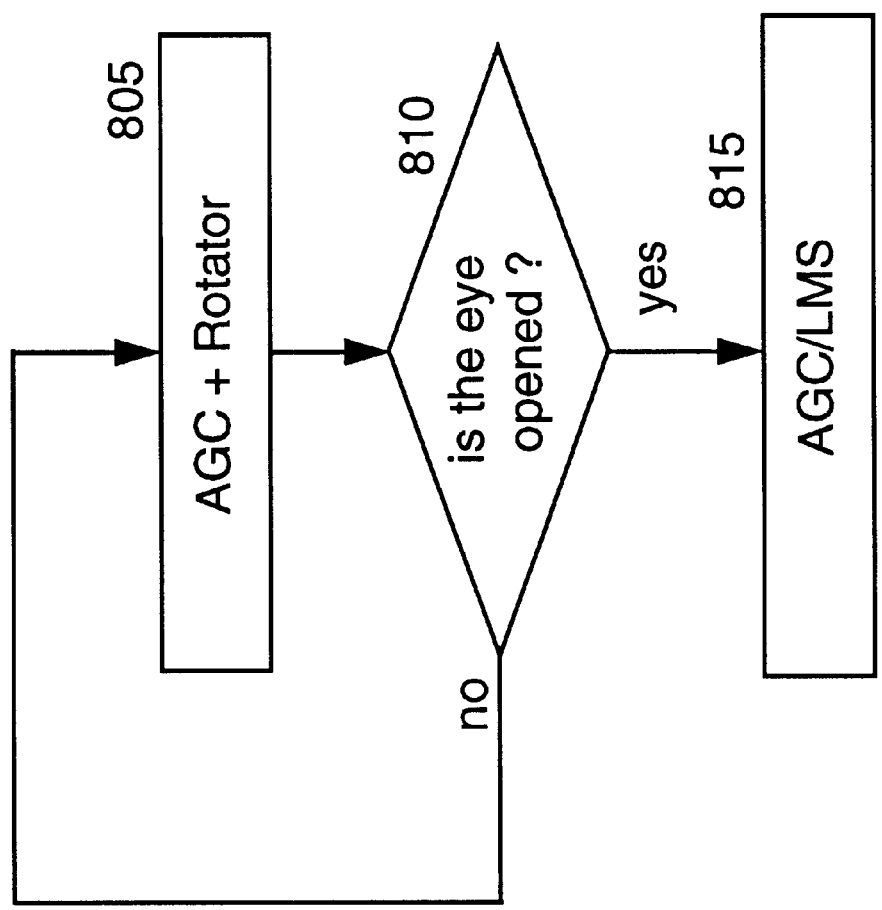
FIG. 11 shows an illustrative start-up procedure in accordance with the principles of the invention.

A start-up procedure in accordance with the principles of the invention for use in the receiver portion of DMT equipment is shown in FIG. 11 for each bin. In step 805, the receiver portion of the DMT equipment uses an AGC+Rotator to begin convergence (e.g., the structure shown in FIG. 9). In step 810, a decision is made whether to switch from start-up to steady-state by checking for when a signal condition is reached. Typically, this is referred to in the art as determining if the eye is open enough (as noted above). Step 810 of this procedure can be schedule-driven, event-driven, or both. With a schedule-driven approach, the switch occurs after some fixed number, K, of iterations (which can be determined by a counter, for example). This approach presumes a certain amount of eye-opening after K iterations. (Simulations with the channel characterized in FIG. 5 indicate that the AGC+rotator combination opens the eye for all channels in less than 100 iterations.) With an event-driven approach, the switch occurs when a certain quality of eye opening is achieved. This can be done, for example, by continuously monitoring the MSE and making the switch when the MSE is below some threshold S. If the eye has been opened enough, the receiving DMT equipment switches to the LMS Adaptation algorithm in step 815 (e.g., the structure shown in FIG. 10). In steady-state, either the AGC can continue to be updated in order to track the dynamics of the channel, or AGC updates can be stopped to reduce the adaptation fluctuation. As a result of the above, and in accordance with the principles of the invention, the use of an AGC filter to increase the input power leads to improving the convergence rate for DMT applications.

Figure 12:
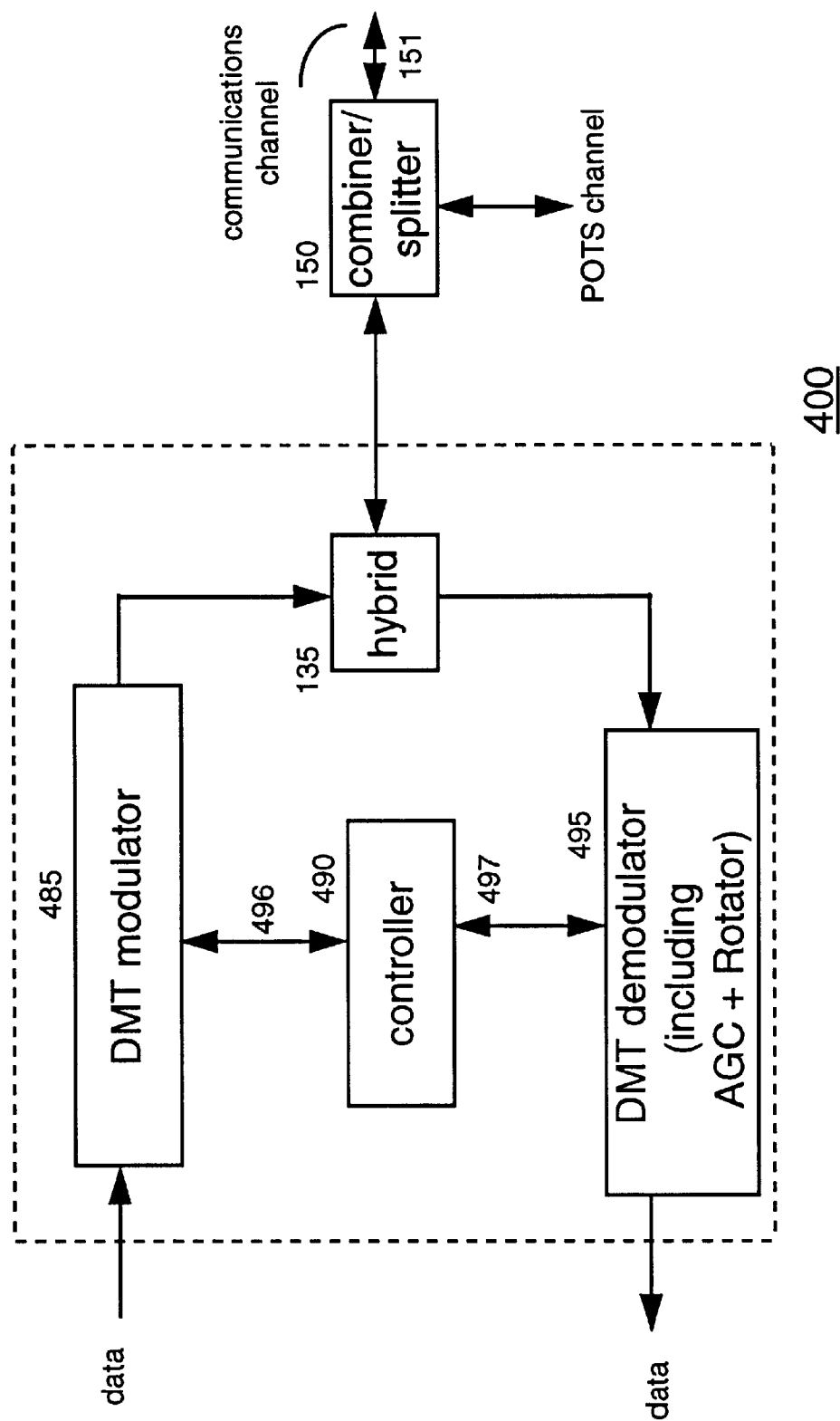
FIG. 12 shows ADSL equipment in accordance with the principles of the invention.

Illustrative ADSL equipment 400 embodying the principles of the invention for use in the ADSL system of FIG. 6 is shown in FIG. 12. DSL equipment 400 comprises DMT modulator 485, DMT demodulator 495 (which comprises an AGC+Rotator, described above), hybrid 135, and controller 490, which is illustratively a stored-program controller and associated memory as known in the art. DMT modulator 485 forms an ADSL signal for transmission on twisted pair 151 via hybrid 135 and combiner/splitter 150. DMT demodulator 495 recovers data from received ADSL signals provided by combiner/splitter 150 and hybrid 135. Controller 490 controls and receives information from DMT modulator 485 and DMT demodulator 495 via signaling 496 and 497, respectively.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., DMT modulator, etc., the functions of any one or more of those building blocks can be carried out using one or more appropriately programmed processors, e.g., a digital signal processor, etc.

Also, although the inventive concept was illustrated using a specific ADSL DMT bandwidth allocation scheme, the inventive concept is applicable to ADSL DMT in general including those versions that extend above 1.1 MHz and symmetric DSL. Indeed, the inventive concept is applicable to any multi-tone, or multi-carrier, communications system DSL or otherwise. In addition, although the above-described approach provided the added benefit of not requiring a training sequence, the inventive concept also improves convergence when a training sequence is used.

What is claimed:

1. A method for use in multi-carrier equipment, the method comprising the steps of:
   receiving a multi-carrier data signal; and
   processing the received multi-carrier data signal such that at least one of the carriers is equalized by an automatic gain control element and a rotator element, wherein:
      during a start-up phase, the automatic gain control element and the rotator element are configured to use a first algorithm of operation; and
      during a steady-state phase, the automatic gain control element and the rotator element are configured to use a second algorithm of operation different from the first algorithm.

2. The method of claim 1 wherein the automatic gain control element and rotator element are used in place of a complex finite impulse response filter.

3. The method of claim 1 wherein the multi-carrier data signal is a discrete multi-tone (DMT) signal.

4. The method of claim 1 wherein the multi-carrier equipment is asynchronous digital subscriber line equipment.

5. A method for use in multi-carrier equipment, the method comprising the steps of:
   receiving a multi-carrier data signal; and
   processing the received multi-carrier data signal such that for at least one of the carriers an automatic gain control element and a rotator is used in place of a complex finite impulse response filter.

6. The method of claim 5 wherein the multi-carrier data signal is a discrete multi-tone (DMT) signal.

7. The method of claim 5 wherein the multi-carrier equipment is asynchronous digital subscriber line equipment.

8. A method for use in multi-carrier equipment, the method comprising the steps of:
   during a start-up phase, processing at least one carrier of a received multi-carrier data signal by using an automatic gain control element and a rotator; and
   during a steady-state phase, processing the at least one carrier by using a least mean-square type of algorithm.

9. The method of claim 8 further comprising the step of changing from the start-up phase to the steady-state phase upon determining that a signal condition is reached for the received multi-carrier signal.

10. The method of claim 9 wherein the signal condition is event-driven.

11. The method of claim 9 wherein the signal condition is schedule-driven.

12. Receiver apparatus comprising:
    a fast Fourier transform element for providing a plurality of signals, each signal representing a symbol stream; and
    at least one automatic gain control element and at least one rotator element configured to equalize at least one signal of the plurality of signals, wherein:
       during a start-up phase, the at least one automatic gain control element and the at least one rotator element are configured to use a first algorithm of operation; and
       during a steady-state phase, the at least one automatic gain control element and the at least one rotator element are configured to use a second algorithm of operation different from the first algorithm.

13. The receiver apparatus of claim 12 comprising a plurality of automatic gain control and rotator elements, one such element for each of the plurality of signals.

14. The receiver apparatus of claim 12 wherein the fast Fourier transform element processes a received multi-carrier signal.

15. The receiver apparatus of claim 14 wherein the received multi-carrier signal is a discrete multi-tone (DMT) signal.

16. The receiver apparatus of claim 12 wherein the receiver apparatus is for use in asynchronous digital subscriber line equipment.

17. Apparatus comprising:
    a hybrid for receiving a multi-carrier signal; and
    a multi-carrier demodulator for recovering a data signal from the received multi-carrier signal such that the multi-carrier demodulator uses an automatic gain control element and a rotator in place of a complex finite impulse response filter for processing at least one of the received carriers.

18. The apparatus of claim 17 wherein the processing is performed during a start-up phase.

19. The apparatus of claim 17 wherein the multi-carrier signal is a discrete multi-tone (DMT) signal.

20. The apparatus of claim 17 wherein the apparatus is asynchronous digital subscriber line equipment.

21. Apparatus comprising:
    a multi-carrier modulator for transmitting a multi-carrier signal over a transmission medium; and
    a multi-carrier demodulator for receiving a multi-carrier signal from the transmission medium, wherein the multi-carrier demodulator recovers a data signal from the received multi-carrier signal such that the multi-carrier demodulator uses an automatic gain control element and a rotator in place of a complex finite impulse response filter for processing at least one of the received carriers.

22. The apparatus of claim 21 wherein the replaced complex finite impulse response filter comprises one tap.

23. The apparatus of claim 21 wherein the processing is performed during a start-up phase.

24. The apparatus of claim 21 wherein the multi-carrier signal is a discrete multi-tone (DMT) signal.

25. The apparatus of claim 21 wherein the apparatus is asynchronous digital subscriber line equipment.

26. Apparatus comprising:
a multi-carrier modulator for transmitting a multi-carrier signal over a transmission medium; and
a multi-carrier demodulator for receiving a multi-carrier signal from the transmission medium, wherein, during a start-up phase, the multi-carrier demodulator processes at least one carrier of the received multi-carrier data signal by using an automatic gain control element and a rotator, and, during a steady-state phase, processes the at least one carrier by using a least mean-square type of algorithm.

27. The apparatus of claim 26 wherein the multi-carrier signal is a discrete multi-tone (DMT) signal.

28. The apparatus of claim 26 wherein the apparatus is asynchronous digital subscriber line equipment.

29. The apparatus of claim 26 wherein the multi-carrier demodulator changes from the start-up phase to the steady-state phase upon determining that a signal condition is reached for the received multi-carrier signal.

30. The apparatus of claim 29 wherein the signal condition is event-driven.

31. The apparatus of claim 29 wherein the signal condition is schedule-driven.

32. A method for use in multi-carrier equipment, the method comprising the steps of:
during a start-up phase, processing at least one carrier of a received multi-carrier data signal by using an automatic gain control element and a rotator; and
during a steady-state phase, processing the at least one carrier by using an automatic gain control element before processing by an equalizer.

33. The method of claim 32 further comprising the step of changing from the start-up phase to the steady-state phase upon determining that a signal condition is reached for the received multi-carrier signal.

34. The method of claim 33 wherein the signal condition is event-driven.

35. The method of claim 33 wherein the signal condition is schedule-driven.

36. The method of claim 32 further comprising the step of using a least mean-square type of algorithm in the equalizer.

37. Receiver apparatus comprising:
a fast Fourier transform element for providing a plurality of signals, each signal representing a symbol stream, and
at least one automatic gain control element configured to control the gain of at least one signal of the plurality of signals before equalization of said signal, wherein:
during a start-up phase, the at least one automatic gain control element is configured to use a first algorithm of operation; and
during a steady-state phase, the at least one automatic gain control element is configured to use a second algorithm of operation different from the first algorithm.

38. The receiver apparatus of claim 37 wherein the fast Fourier transform element processes a received multi-carrier signal.

39. The receiver apparatus of claim 37 wherein the received multi-carrier signal is a discrete multi-tone (DMT) signal.

40. The receiver apparatus of claim 37 wherein the receiver apparatus is for use in asynchronous digital subscriber line equipment.

41. Apparatus comprising:
a hybrid for receiving a multi-carrier signal; and
a multi-carrier demodulator for recovering a data signal from the received multi-carrier signal such that the multi-carrier demodulator uses an automatic gain control element before equalization of at least one of the received carriers, wherein:
during a start-up phase, the automatic gain control element is configured to use a first algorithm of operation; and
during a steady-state phase, the automatic gain control element is configured to use a second algorithm of operation different from the first algorithm.

42. The apparatus of claim 41 wherein the multi-carrier signal is a discrete multi-tone (DMT) signal.

43. The apparatus of claims 41 wherein the apparatus is asynchronous digital subscriber line equipment.

44. Apparatus comprising:
a multi-carrier modulator for transmitting a multi-carrier signal over a transmission medium; and
a multi-carrier demodulator for receiving a multi-carrier signal, from the transmission medium, wherein, during a start-up phase, the multi-carrier demodulator processes at least one carrier of the received multi-carrier data signal by using an automatic gain control element and a rotator, and, during a steady-state phase, processing the at least one carrier by using an automatic gain control element before processing by an equalizer.

45. The apparatus of claim 44 wherein the multi-carrier signal is a discrete multi-tone (DMT) signal.

46. The apparatus of claim 44 wherein the apparatus is asynchronous digital subscriber line equipment.

47. The apparatus of claim 44 wherein the multi-carrier demodulator changes from the start-up phase to the steady-state phase upon determining that a signal condition is reached for the received multi-carrier signal.

48. The apparatus of claim 47 wherein the signal condition is event-driven.

49. The apparatus of claim 47 wherein the signal condition is schedule-driven.

50. The apparatus of claim 44 wherein the multi-carrier demodulator uses a least mean-square type of algorithm in the equalizer.

51. The method of claim 1, wherein the first algorithm is an error-driven algorithm and the second algorithm is a least mean-square algorithm.

52. The receiver apparatus of claim 12, wherein the first algorithm is an error-driven algorithm and the second algorithm is a least mean-square algorithm.

53. The receiver apparatus of claim 37, wherein the first algorithm is an error-driven algorithm and the second algorithm is a least mean-square algorithm.

54. The apparatus of claim 41, wherein the first algorithm is an error-driven algorithm and the second algorithm is a least mean-square algorithm.

55. The method of claim 1, wherein a single circuit provides both the automatic gain control and rotator functions.

56. The method of claim 5, wherein a single circuit provides both the automatic gain control and rotator functions.

57. The method of claim 8, wherein a single circuit provides both the automatic gain control and rotator functions.

58. The receiver apparatus of claim 12, wherein a single circuit provides both the automatic gain control and rotator functions.

59. The apparatus of claim 17, wherein a single circuit provides both the automatic gain control and rotator functions.

60. The apparatus of claim 21, wherein a single circuit provides both the automatic gain control and rotator functions.

61. The apparatus of claim 26, wherein a single circuit provides both the automatic gain control and rotator functions.

62. The method of claim 32, wherein a single circuit provides both the automatic gain control and rotator functions.

63. The apparatus of claim 44, wherein a single circuit provides both the automatic gain control and rotator functions.

* * * * *

UNITED STATES PATENT AND TRADEMARK OFFICE
CERTIFICATE OF CORRECTION

PATENT NO. : 6,452,987 B1  
DATED : September 17, 2002  
INVENTOR(S) : Patrik Larsson, Jean-Jaques Werner and Jian Yang It is certified that error appears in the above-identified patent and that said Letters Patent is hereby corrected as shown below:

<u>Title page,</u>
Item [56], References Cited, replace:
"5,809,704 A    11/1996       Werner et al.    375/233." with
-- 5,809,704 A    9/1998       Werner et al.    375/233 --.

Signed and Sealed this

Eleventh Day of February, 2003

JAMES E. ROGAN
*Director of the United States Patent and Trademark Office*